UNITED STATES PATENT OFFICE.

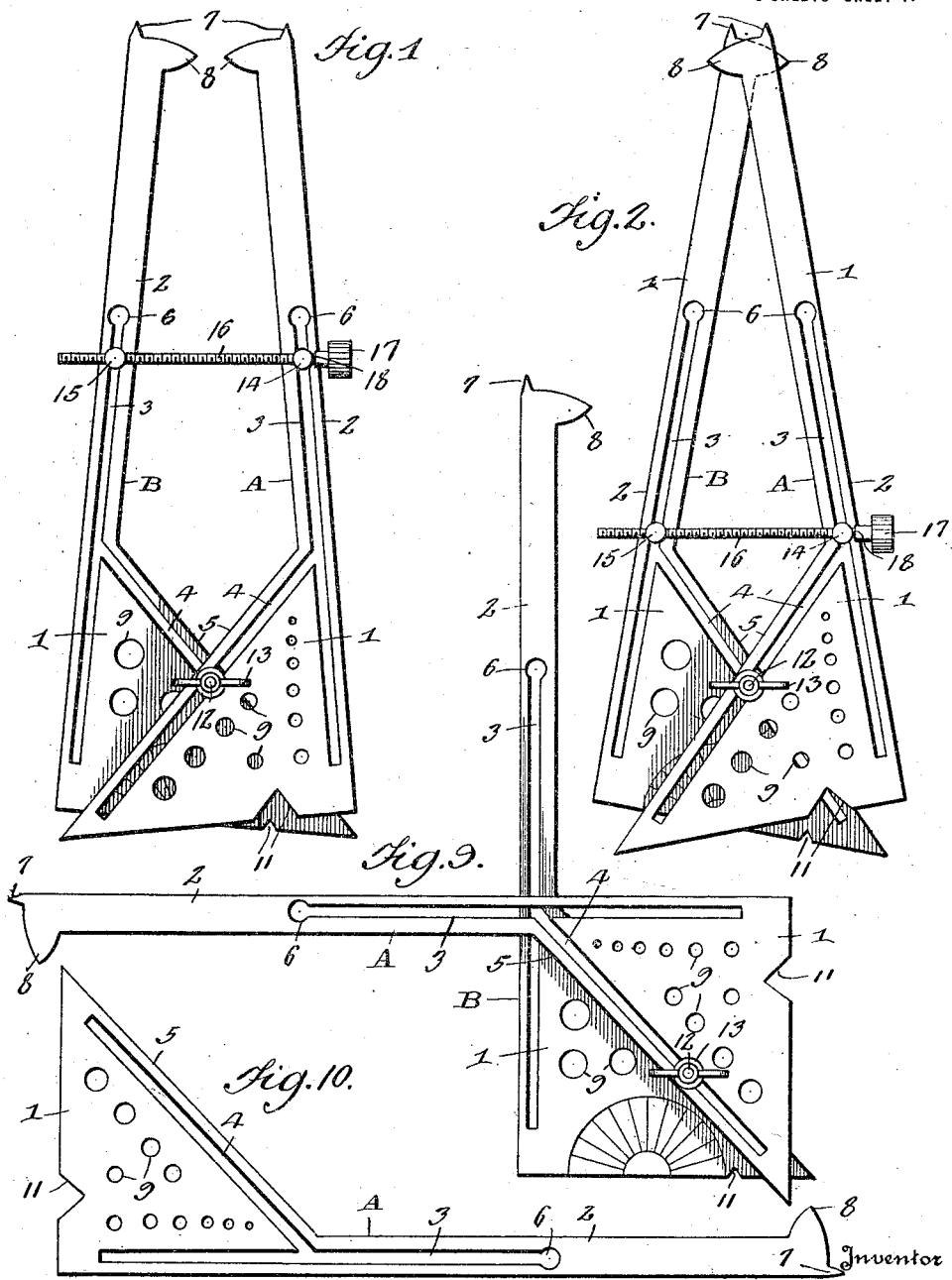

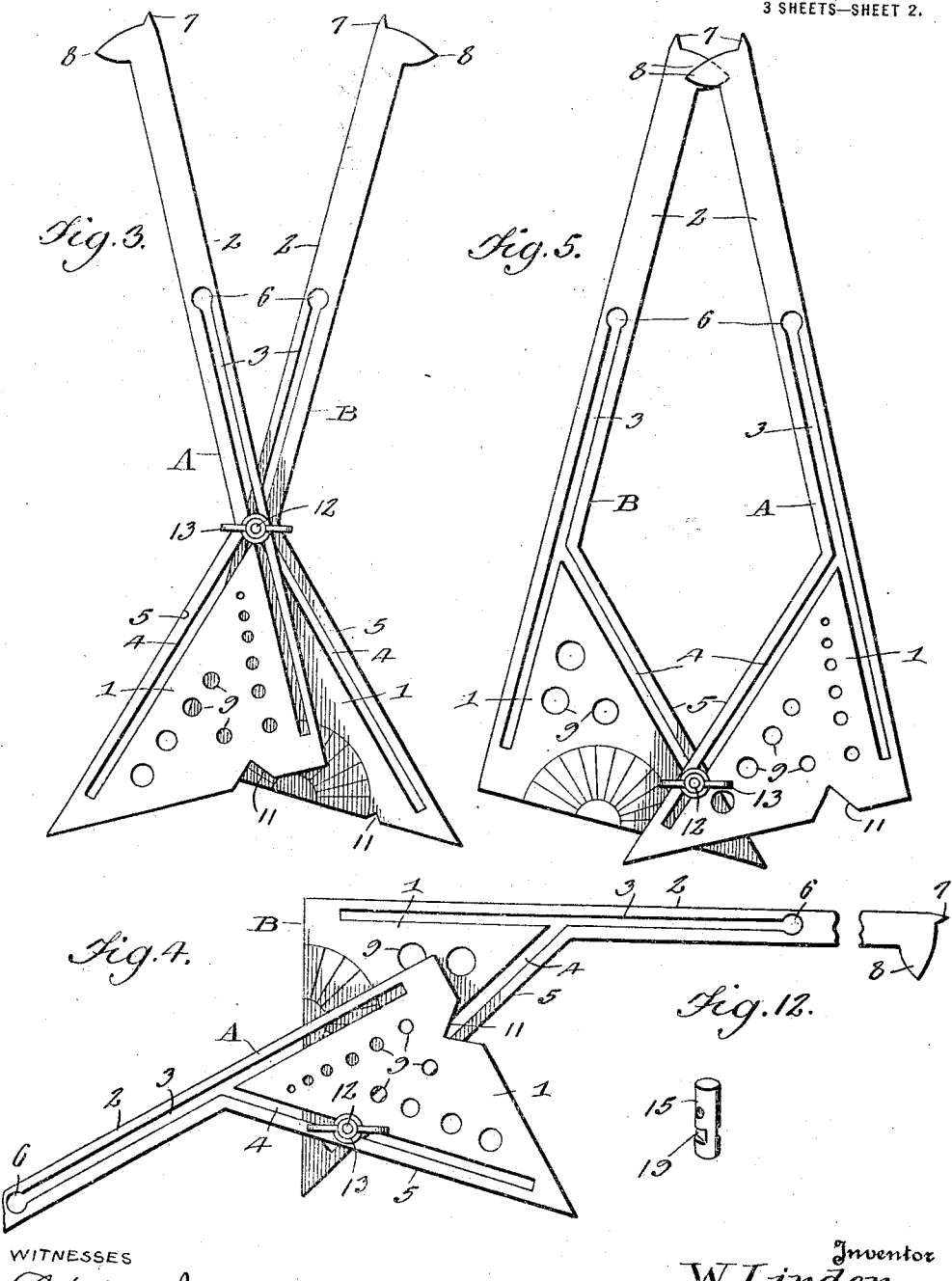

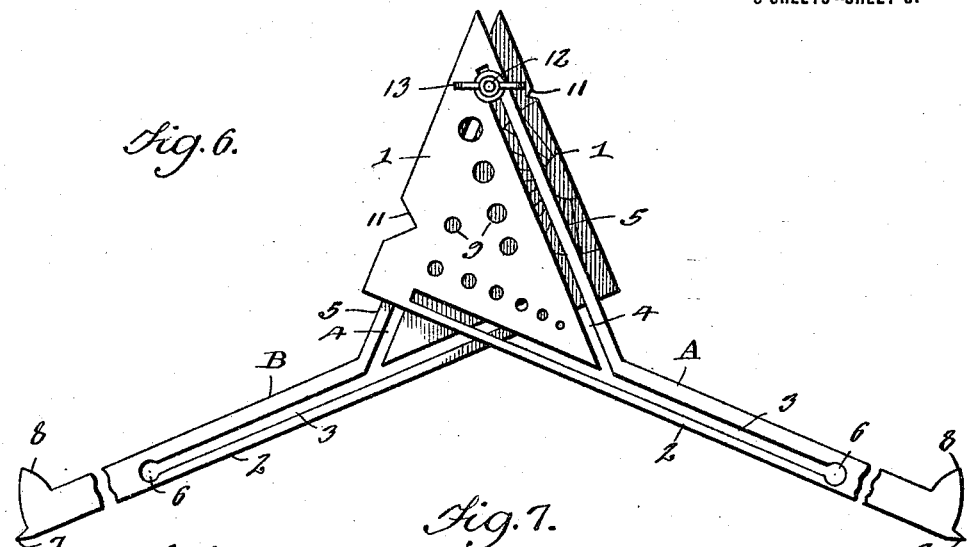
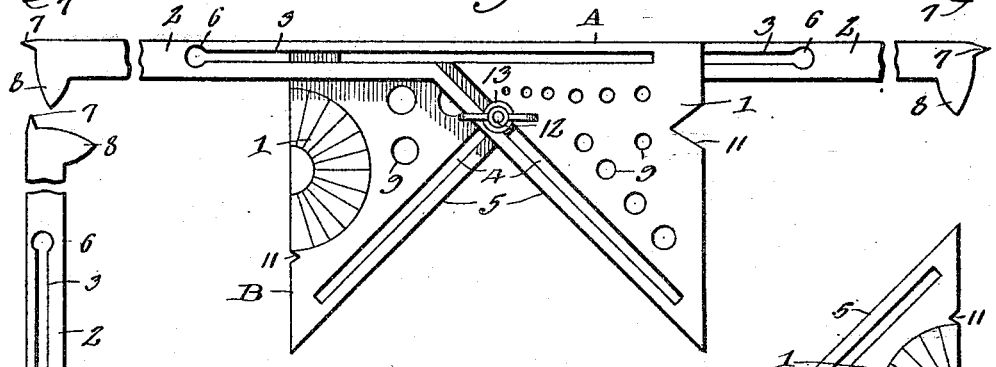
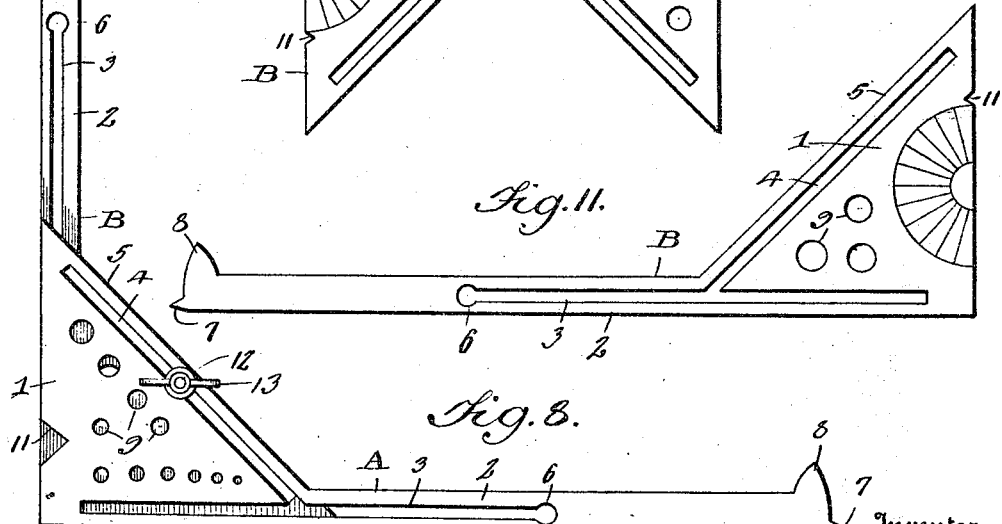
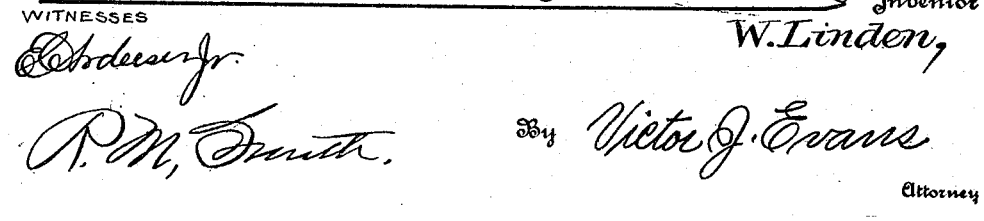

WILLIAM LINDEN, OF PRESCOTT, ARIZONA, ASSIGNOR OF ONE-HALF TO BEN F. GOODWIN, OF PHOENIX, ARIZONA.

CALIPERS AND DIVIDERS.

1,287,056.  Specification of Letters Patent.  Patented Dec. 10, 1918.

Application filed May 4, 1918. Serial No. 232,543.

*To all whom it may concern:*

Be it known that I, WILLIAM LINDEN, a citizen of the United States, residing at Prescott, in the county of Yavapai and State of Arizona, have invented new and useful Improvements in Calipers and Dividers, of which the following is a specification.

This invention relates to calipers and dividers, the object in view being to provide a highly useful article, capable of being used for various purposes, such as outside and inside calipers, drill and tool gage, dividers, extension dividers, taper gage, inside and outside bevel gage, bevel protractor, straight edge, and inside and outside squares.

A further object of the invention is to provide an article of the class referred to which may be conveniently carried in the pocket, and which may be quickly adjusted to perform any of the functions above indicated.

With the above and other objects in view the invention consists in the novel construction, combination and arrangement of parts, as herein described, illustrated and claimed.

In the accompanying drawings,

Figure 1 is a plan view of the device, set for use as an outside caliper.

Fig. 2 is a similar view showing the device adjusted for use as an inside caliper.

Fig. 3 is a plan view of the device adapted for use as dividers.

Fig. 4 is a plan view of the device shown adjusted for use as a bevel protractor.

Fig. 5 is a plan view of the device shown adjusted for use as a taper gage.

Fig. 6 is a plan view of the device adjusted for use as both an inside and outside bevel gage.

Fig. 7 is a plan view of the article adjusted for use as a straight edge and a square.

Fig. 8 is a plan view of the device adjusted for use as a large square.

Fig. 9 is a plan view of the device adjusted for use as an outside square.

Fig. 10 is a plan view of one of the main members of the device.

Fig. 11 is a similar view of the other member.

Fig. 12 is a detail perspective view of one of the studs.

The improved device comprises two main members A and B which closely resemble each other in their general construction. Each of said members A and B comprises a triangular base 1 which is in the form of a right angle triangle. Each member A and B also comprises a straight arm 2 of any suitable length, the same being formed with a slot 3 extending longitudinally thereof. A branch slot 4 leads off from the slot 3 and extends parallel to the hypotenuse edge 5 of the triangular base 1. The slot 3 at its outer end, is enlarged as shown at 6, for a purpose which will appear.

Each arm 2 has at its outer extremity, a spur 7 to adapt the article as a whole to be used as dividers. Adjacent to the terminal spur 7, each arm is formed with a lateral pointed lip 8 for use as inside and outside calipers. The triangular bases 1 are formed with perforations 9 which serve as gages for drills, wire and the like. One or both of the bases may also be formed with one or more angular notches 11 for use as tool gages.

The members A and B are connected by a pivot pin 12 threaded to receive a thumb nut 13 by means of which the members A and B may be clamped tightly in fixed relation to each other after the desired adjustment has been obtained. The pin 12 may be moved to any part of the slots 3 and 4 of the members A and B, as illustrated in the several views, and when necessary said pivot pin 12 may be removed by the unscrewing of the thumb nut. The members A and B are provided with studs 14 and 15 to receive an adjusting screw 16 having a milled head 17 at one end thereof. The adjusting screw 16 has a smooth journal portion 18 which is freely rotatable in the stud 14. The stud 15 has a threaded hole for the feed screw 16. Therefore, when the screw 16 is turned, the arms 2 are caused to move toward or away from each other in accordance with the direction in which the feed screw is turned.

Referring to Fig. 1, to use the device as outside calipers, the thumb nut 13 is loosened and the pin 12 shifted to the desired position in the branch slots 4. The screw 16 is then turned until the lips 8 touch the work. Then the nut 13 is tightened thereby fixing the adjustment. To use the device as inside calipers, the arms 2 are crossed as shown in Fig. 2, the studs 14 and 15 being moved toward the bases 1 of the members A and B. To use the device as ordinary and extension dividers, the parts are positioned as shown in Fig. 3 with the pin 12 arranged approximately at the junction between the slots 3 and 4.

To use the device as a bevel protractor, the parts are arranged in relation to each other as shown in Fig. 4 with the pin 12 in the branch slots 4. To use the device as a taper gage, the parts are disposed in relation to each other as shown in Fig. 5. Fig. 6 illustrates the relative arrangement of the members A and B when the device is to be used either as an inside or outside bevel gage. By arranging the members A and B in relation to each other shown in Fig. 7. The device may be used as a straight edge and it also provides three separate and distinct squares, the hypotenuse edges 5 of the bases 1 being exactly at a right angle to each other, and the other sides of the bases 1 being at a right angle to the arms 2 respectively. Fig. 9 illustrates another relative arrangement of the members A and B in which the arms 2 extend at a right angle to each other, and form a large square, while said arms 2 and the bases 1 form additional smaller squares.

Each of the studs 14 and 15 has an outside diameter greater than the width of the respective slot 3 or 4 in which it is movable but is formed in opposite sides thereof with notches 19 to reduce the same in width to fit and slide along said slots while preventing the escape of the studs from the slots also preventing the said studs from turning or rotating. The enlarged ends 6 of the slots are intended to admit of the insertion and removal of the studs 14 and 15 when the feed screw is not to be used as for example under the arrangement shown in Figs. 3, 4, 5, 6, 7, 8 and 9. It will be observed by reason of the compactness of the device, that it may be readily carried in the pocket.

The protractor shown on the base B of one of the members embodies graduations which will ordinarily be marked off in degrees, say from 1 to 90 degrees, so that by placing one leg or member of the device over the other on the 90 degree graduation, a right angle square will be formed and by adjusting one leg upon the other to other graduations, any desired number of degrees may be obtained between the legs of the device.

I claim:

1. In a device of the class described, a pair of members each comprising a triangular base, a straight arm extending from one angle of said base, and connecting and clamping means for securing said members together, each of said members being formed with a slot extending longitudinally of the arm thereof and a branch slot extending at an angle to the aforesaid slot and intersecting the same, the connecting and clamping means being adjustable along said slots.

2. In a device of the class described, a pair of members each comprising a triangular base, a straight arm extending from one angle of said base, a connecting and clamping means for securing said members together, each of said members being formed with a slot extending longitudinally of the arm thereof and a branch slot extending at an angle to the aforesaid slot and intersecting the same, the connecting and clamping means being adjustable along said slots, studs adjustable longitudinally of said slots, and an adjusting screw having a swivel connection with one of said studs, and a threaded connection with the other stud.

3. In a device of the class described, a pair of members each comprising a triangular base, a straight arm extending from one angle of said base, a connecting and clamping means for securing said members together, each of said members being formed with a slot extending longitudinally of the arm thereof and a branch slot extending at an angle to the aforesaid slot and intersecting the same, the connecting and clamping means being adjustable along said slots, studs adjustable longitudinally of said slots, an adjusting screw having a swivel connection with one of said studs and a threaded connection with the other stud, one slot of each member being formed with an enlarged end portion to admit of the insertion and removal of the respective stud.

4. In a device of the class described, a pair of members each comprising a triangular base, a straight arm extending from one angle of said base, a connecting and clamping means for securing said members together, each of said members being formed with a slot extending longitudinally of the arm thereof and a branch slot extending at an angle to the aforesaid slot and intersecting the same, the connecting and clamping means being adjustable along said slots, studs adjustable longitudinally of said slots, an adjusting screw having a swivel connection with one of said studs and a threaded connection with the other stud, one slot of each member being formed with an enlarged end portion to admit of the insertion and removal of the respective stud, each stud having an outside diameter greater than the width of the respective slot and being reduced in width at one point to enable the stud to be shifted along the slots of the respective member, whereby the stud is prevented from escaping and turning.

5. In a device of the class described, a pair of members each comprising a triangular base, a straight arm extending from one angle of said base, a connecting and clamping means for securing said members together, each of said members being formed with a slot extending longitudinally of the arm thereof and a branch slot extending at an angle to the aforesaid slot and intersecting the same, the connecting and clamping means being adjustable along said slots, each base being in the form of a right angle triangle.

In testimony whereof I affix my signature.

WILLIAM LINDEN.

Copies of this patent may be obtained for five cents each, by addressing the "Commissioner of Patents, Washington, D. C."